US006600967B2

(12) United States Patent
Milligan et al.

(10) Patent No.: US 6,600,967 B2
(45) Date of Patent: Jul. 29, 2003

(54) AUTOMATED PHYSICAL DISK STORAGE AND MANAGEMENT

(75) Inventors: Charles A. Milligan, Golden, CO (US); James P. Hughes, Lino Lakes, MN (US); Gerald O'Nions, Toulouse (FR)

(73) Assignee: Storage Technology Corporation, Louisville, CO (US)

(*) Notice: Subject to any disclaimer, the term of this patent is extended or adjusted under 35 U.S.C. 154(b) by 19 days.

(21) Appl. No.: 10/026,978

(22) Filed: Dec. 20, 2001

(65) Prior Publication Data

US 2003/0120386 A1 Jun. 26, 2003

(51) Int. Cl.[7] .................................................. G06F 7/00
(52) U.S. Cl. .................... 700/214; 700/246; 700/247; 700/248; 700/249; 700/251; 700/253; 700/259; 700/260; 700/214; 700/215; 700/216; 700/245; 318/568.1; 318/568.11; 318/568.12; 318/561; 360/69; 360/71; 360/92; 360/93; 701/14; 701/23; 701/30
(58) Field of Search ................................ 700/247, 245, 700/246, 248, 249, 251, 253, 259, 260, 214, 215, 216; 235/380, 385; 707/104.1; 318/568.1, 568.12, 568.11, 561; 360/92, 93, 69, 71; 701/14, 23, 30

(56) References Cited

U.S. PATENT DOCUMENTS

| | | | |
|---|---|---|---|
| 5,253,246 A | 10/1993 | Leonhardt et al. | 369/291 |
| 5,274,584 A | 12/1993 | Henderson et al. | 365/64 |
| 6,144,391 A * | 11/2000 | Hinson et al. | 345/540 |
| 6,153,999 A * | 11/2000 | Borrego | 318/568.11 |
| 6,304,798 B1 * | 10/2001 | Carpenter | 700/258 |
| 6,327,519 B1 * | 12/2001 | Ostwald et al. | 700/245 |
| 6,381,517 B1 * | 4/2002 | Butka et al. | 700/247 |
| 6,480,759 B1 * | 11/2002 | Ostwald et al. | 700/245 |
| 6,512,963 B1 * | 1/2003 | Felde et al. | 700/215 |
| 2003/0002203 A1 * | 1/2003 | Gustafson et al. | 360/92 |
| 2003/0002204 A1 * | 1/2003 | Ostwald et al. | 360/92 |

OTHER PUBLICATIONS

ADIC, Automated mixed media library, 2000, Internet, pp. 1–6.*

Frazelle, Design problems in automated warehousing, 1986, IEEE, pp. 486–489.*

* cited by examiner

Primary Examiner—William A. Cuchlinski, Jr.
Assistant Examiner—McDieunel Marc
(74) Attorney, Agent, or Firm—Carstens, Yee & Cahoon, L.L.P.

(57) ABSTRACT

A data storage system for remote access to stored data. The innovative system uses a storage library to contain magnetic hard disks and automatically replaces the hard disks upon failure, without human intervention. Failed disks are removed from the library by a robot, deposited from the library, upon which time they are further processed for delivery to the manufacturer, or for disposal. Replacement disk drives are accessed by the robot from within the library to replace the removed storage element. The system's robot is not only moving individual storage elements, but also of moving the access cables connecting the storage elements to the external network. Using this capability, the number of access cables is reduced without requiring added human intervention.

30 Claims, 2 Drawing Sheets

AUTOMATED PHYSICAL DISK STORAGE AND MANAGEMENT

FIELD OF THE INVENTION

The current invention relates to storage systems, and in particular to automated data storage libraries for remote access and archiving and otherwise efficient storage of data.

BACKGROUND OF THE INVENTION

In the field of data storage systems, a purpose driving innovation is the need for access to information wherein the storage of the data that carries the information is both inexpensive and also has a fast data access time. Units of memory or storage elements have generally addressed the cost concern at the expense of access time, or have addressed access time at the expense of cost. They can be divided into several sets of general categories: serial and random, online vs. nearline vs. offline, fixed and removable. Serial storage elements (like tape media) have historically had significantly more ability to store data at less cost than random access media. Online has generally been identified with fixed storage elements. Removable storage elements have been divided into automated sets (i.e., in robotically controlled libraries) and manual sets. Fixed units of memory address access time concerns and are integrated with a read/write device such that they are directly connected to an associated data processing system at all times. Removable units of memory or storage elements address storage cost and are generally not integrated with read/write capabilities, or with power at all times, instead residing in a storage library (for example). The storage library itself contains a number of read/write drives capable of mounting individual storage elements. The individual storage elements are typically moved from a storage slot to the read/write device by a robotic access device or other means. The current systems also include metadata that allow the storage subsystem to interpret virtual volume requirements and configure physical storage resources such as, for example, groups of storage elements organized as a striping group for performance or as a redundancy group for reliability. There is also provision in current systems to instruct storage systems to carry out operations on the basis of policy. Policy can be stated in terms of events or change of status or an algorithm. An example of an event is to do a backup at midnight every night. An example of an algorithm is to make a copy when either there have been more than 1 megabyte of data written or twenty four hours have elapsed since the oldest write data has been copied Examples of adapting a magnetic tape cartridge style storage library to contain magnetic disks (e.g., hard disk drives) are known. For example, previous solutions teach a universal data storage element, where a uniform form factor is presented that can accept different storage elements (also known as media). This allows multiple types of media to be stored in an automated storage library without needing to alter the storage library drastically.

As technological advances are made in storage media and devices, the costs of such media and devices generally decrease. This has been the case particularly with respect to devices such as IDE/ATA disk drives. The decreased cost in these kinds of drives has made random access to data possible at a cost much nearer to that of serial access storage media.

In the current application, the different storage slots are referred to in terms of their relationship to a read/write port (such as, for example a device that can accept the storage element, which device is connected to send data to and receive data from a network). The slots are also referred to in terms of whether they are currently supplied with power (i.e., whether the data on the individual storage element in that slot can be accessed without the additional action of connecting the individual storage element to a power supply). Slots that are supplied with power are referred to herein as "hot" slots, while unpowered slots are herein referred to as "cold" slots.

Additionally, some slots can be used to store data storage elements, while others may be empty. Also some slots may contain storage elements that do not themselves contain data or are not in use by or even known to the management systems that maintain the metadata controls to map the using system requests to physical locations. Slots that are used for storage elements that contain data that has been supplied by and will be accessed by the using systems are called inventory slots. Slots that contain storage elements that are known to the management systems, but that have never been used to store data are called standby. Slots that contain storage elements that are not known to the management systems are called spares. Slots that contain no storage elements are called empty.

Active slots refers to those which are connected to using system(s) in such a fashion as to allow a storage element to be read from or written to through the connection, preferably to a network. The tape devices in a robotically controlled tape library would be examples of active slots. Typically, because of space and cost restrictions, a majority of storage slots in a library are not active slots, but instead are passive slots. Typically, only 0.5% to 5% of a library's slots are active slots. When a storage element in a passive slot must be accessed, it is typically moved by a robotic manipulator of some kind to an active slot (e.g., a read/write drive).

The expense of a library is increased with each added active slot because the cost of adding read/write mechanisms and communication mechanisms such as cables to the library is prohibitive, both in terms of money and limited space. Therefore, typically most slots are not active, which requires that data storage elements must be moved from their passive slot to an active one for accessing.

Some storage libraries that require fast access to archived data replace the serial access storage elements (such as magnetic tape drives) with random access storage elements (such as a magnetic disk drive, for example, an IDE/ATA drive). In such libraries, if all slots are active slots, it requires every storage slot to be connected to a read/write device with a connection cable.

Current large computing systems make extensive use of disk devices (i.e., random access storage elements) for online storage data. When an installation has thousands of disk drives in use, there are always a significant number of drives requiring some maintenance operation at any one point in time. For example, the large scientific computing centers have 10 to 100 TB of disk configured in racks from 4 GB to 40 GB drives which use thousands of square feet of floor space. At any given moment, an observation of the computer floor area will show a number of drive doors open awaiting the swapping out of individual disk drives. For these installations, a quantity of spare disk drives are kept in a spare parts inventory room on site.

It would therefore be advantageous to have a storage system that allowed remote users random (rather than serial) access to stored data, but which requires little or no human operator intervention for operation and maintenance.

SUMMARY OF THE INVENTION

The current application discloses a system and method of maintaining an automated storage library that allows a mixture of serial access and random access storage elements (e.g., tape cartridges, new technology like holographic cubes or MEMS-Probe, and disk drives) to be stored therein. It takes advantage of the emergence of new technologies and the decreasing costs of IDE/ATA disk drives to provide random access to data in a fully automated storage library.

In a preferred embodiment, an automated storage library is built to contain random access storage elements (for example ATA disk drives) or a library design for serial access storage elements is modified so as to contain random access storage elements in addition to the serial access storage elements (for example). Maintenance software and hardware is presented that automatically takes care of maintenance tasks. Some of these are currently performed by human operators, such as ordering copies of data for backup or archive. The storage system can also respond to changes in the requirements a "using system" communicates to the "storage subsystem" defining a specific virtual volume that is currently employed. For example, the using system could change the reliability index of a set of data and thereby drive the subsystem to change the redundancy mechanism (for example to require multiple backups or mirrors or to require a local and a remote mirror). Another example is to increase or decrease the number of RAID 5 type redundancy such as going from a 4+1 parity scheme to an 8+3. The subsystem is also capable of replacing malfunctioning storage elements.

In one example embodiment, the innovative storage system is designed to automatically remove any malfunctioning drives or storage elements, package them, and convey them outside the storage library itself to a location for easy disposal (if necessary) or other treatment (such as mailing them back to a manufacturer). The defective storage element can be replaced by the storage system's robot, which fetches a new drive from a storage location, preferably located within the library itself.

In another example embodiment, the storage system's internal robot (normally used to relocate storage elements within the library, for example, from an inactive slot to an active slot or a read/write drive) is used to reconnect access cables from storage slot to storage slot. The mass of a cable connection is generally significantly less than the mass of a tape cartridge or a disk drive, thus decreasing access times to data. This alleviates the need to move the data storage elements themselves in order to access the data thereon, and reduces the total number of necessary active slots in the library.

In another example embodiment, the innovative storage system is used to reduce the cycle time between a storage element malfunctioning and its replacement. This is accomplished, for example, by maintaining a redundancy mechanism related to the storage elements in a library. This can be done with complex functions like those used to implement random arrays of inexpensive disk (RAID) in what is known as RAID 5. The simplest approach is to use the RAID 1 mechanism, which is a simple copy function. RAID 1 renders a copy of each identified storage element within the library, specifically in an active slot. However, when the storage system is maintaining the mirror, it is preferably created in a slot that is spare or standby rather than part of the main inventory. This is referred to hereinafter as ghost mirroring the storage element. If a storage element fails or its data becomes otherwise inaccessible, the defective storage element is removed, its mirror (or ghost mirror) is connected (i.e., made the principle location in of the main inventory, for example, by using the robot to connect a specific access cable to that storage element's slot or moving the storage element itself to the known slot, or modifying the metadata to point at the new location). Then its contents are copied to a spare drive kept within the library itself (thus reestablishing the ghost mirror). This spare drive can then be associated with or relocated to the slot previously occupied by the storage element previously being used as the ghost mirror, thereby replacing it.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
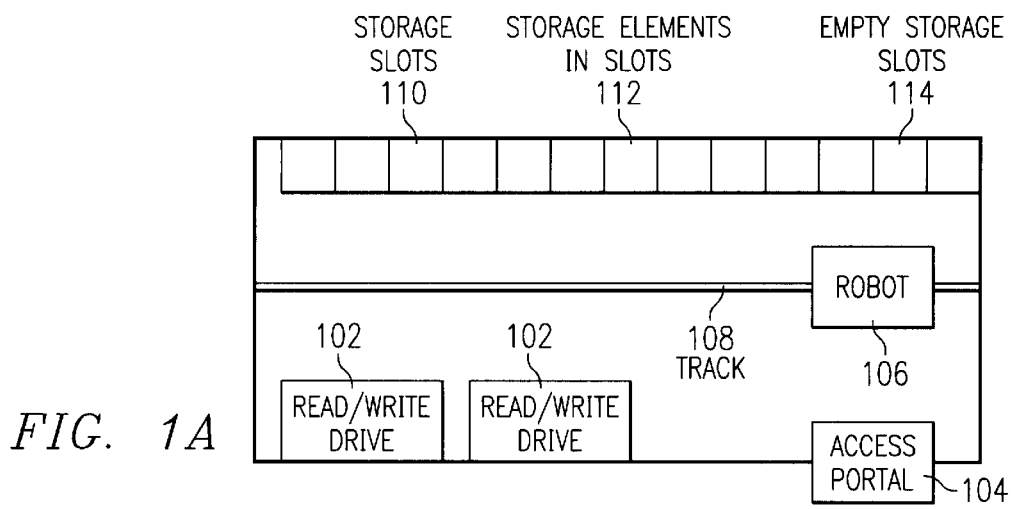
FIG. 1A shows a prior art linear storage library using a robot.

The present invention is described with reference to the figures. FIG. 1A shows a prior art storage system. In this figure, a storage system is represented as a block diagram having read/write drives 102 which are preferably connected to a network, access portal 104, robot 106, a path 108 upon which robot 106 travels and which restricts the number of degrees of freedom (and the area) in which the robot travels, and storage slots 110. Some of the storage slots contain storage elements 112, preferably magnetic hard disk drives (though any data storage element design is applicable). Some of the storage slots are empty 114 or contain storage elements that contain no data—(i.e., spare storage elements).

In order for a remote user to access the data on the storage elements of the library, the robot moves within its degrees of freedom (typically along the path, including any rotation or other movement) to the necessary storage element, removes it from its slot, and inserts the storage element into one of the read/write drives. When the access is complete, the robot returns the storage element to a storage slot.

Figure 1B:
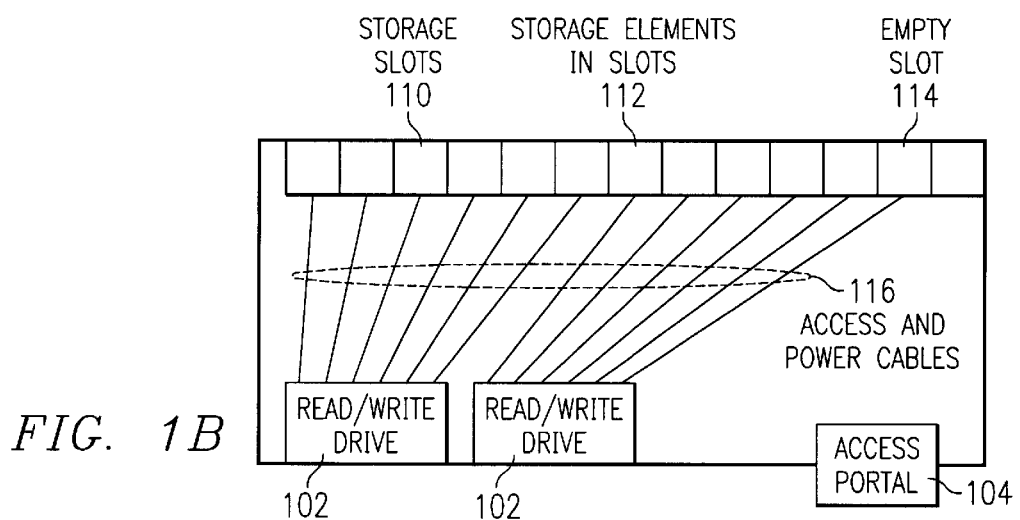
FIG. 1B shows a relying on access cables to and from every accessible storage element.

FIG. 1B shows a similar setup, but this one relies on access cables 116 attached to each of the active storage slots 110 rather than a robot moving storage elements 112. When data is required from one of the storage elements, the read/write drive 102 simply reads the data from that selected slot through the access cable. Without a robot, there must be as many access cables as there are storage elements. This configuration is similar to current online configurations of disk drives, i.e., extremely expensive compared to nearline tape configurations.

Figure 2:
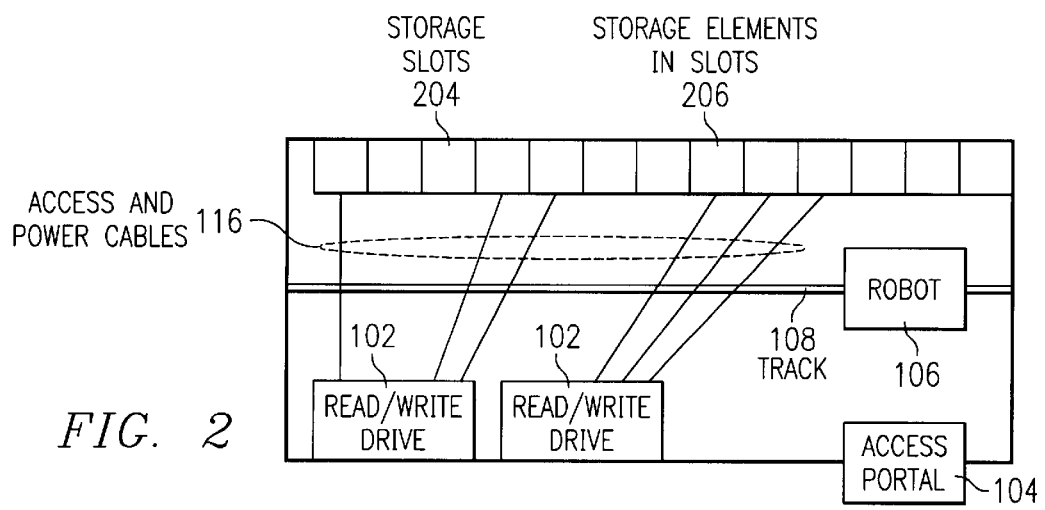
FIG. 2 shows an innovative storage array according to a preferred embodiment.

FIG. 2 shows one embodiment of the present innovations. The storage system includes the read/write drives 102, the storage slots 204 and storage elements 206 therein, an access port 104, and a robot 106 bounded by limitations on its degrees of motion on a path 108. A plurality of access cables 116 also attaches some selected storage slots to the read/write drives.

In a preferred embodiment, there are fewer power cables and/or access cables than there are storage slots, and the robot is capable of disconnecting any given access cable from any given storage slot and reattaching it to another storage slot. This alleviates the need for cables attached to each and every storage slot. Thus, when a remote user requires access to a storage element that is not currently hot or active, the robot is directed by control software (not shown) to disconnect a non-accessed storage element (thereby making it cold or passive) and attach the cable to the desired storage element. The control software must also then map the newly attached cable as a known path to the using system. The newly powered or activated storage element can then be read or written to (this includes slots that are physically located remotely from the other slots), depending on the particular implementation.

This innovation alleviates the need for having a connector cable for every storage slot in the library. For example, rather than having 5000 access cables in a storage system to access 5000 storage slots, the innovative storage system can operate with only 500 cables for the 5000 storage slots, attaching the cables to the required storage elements dynamically and automatically as they are accessed by remote users.

Figure 3:
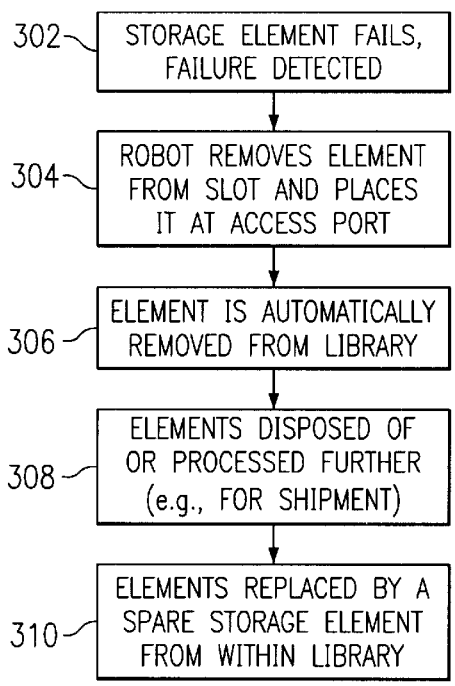
FIG. 3 shows a flow chart of a process for implementing the innovative storage library and method.

FIG. 3 shows a flow chart for another embodiment of the present innovations. In this embodiment, a storage element has failed for some reason (it has become corrupted, for example, or mechanically broken) and must be replaced. In the simplest version of the innovation, the system automatically, without human intervention, detects the failure of the storage element and moves the robot to physically remove the failed element from the storage slot. The storage element is taken to the access port of the library and prepared for removal from the library. Preferably, there is a system in place to automatically take the failed storage element from the library access port and transport it to a location where it can be disposed of or automatically packaged and perhaps even posted with the required postage and address for mailing. The failed storage element can then, with minimal human intervention, be mailed back to the manufacturer or wherever is desired. Thus, when a storage element fails, it is automatically removed and dealt with without the need for a human operator. In addition the notion of keeping an inventory count and actually placing orders for new storage elements as supplies to be automatically inserted into the storage system is enabled. In the final step, the, failed storage element. is replaced by a spare storage element, preferably one that is stored in the library itself and is accessible to the robot. The robot moves the spare to the slot of the mow missing storage element.

The flow chart of FIG. 3 depicts this process. First, the failure of a storage element is detected by the control software of the library or storage system (step 302). The control software sends a command to the robot to remove the failed element from the slot and deposit it at the access port (step 304). From there, the element is automatically taken from the library (step 306) for either disposal or further processing, such as packaging and posting (step 308). Finally, the removed storage element is replaced with a spare storage element by the robot (step 310).

Another embodiment of the present innovations concerns methods of backing up data in a storage library. In the embodiment of FIG. 3, the robot was commanded to extract a failed storage element from the library. Unless that data is also saved on another storage element of that library, the data would be lost. Often data is stored redundantly in a library (for example the topic of ghost mirroring of data was previously discussed, also there are known systems using pointers that allow instant copies of data such as Snapshot), with two separate storage elements containing the data-a non-inventory drive mirroring the data that is written to the active drive, for example, or two active drives mirroring each other. When one storage element of the mirrored pair fails, it is extracted as depicted in FIG. 3. The data from the extracted element is rebuilt from the second element of the mirror.

Figure 4:
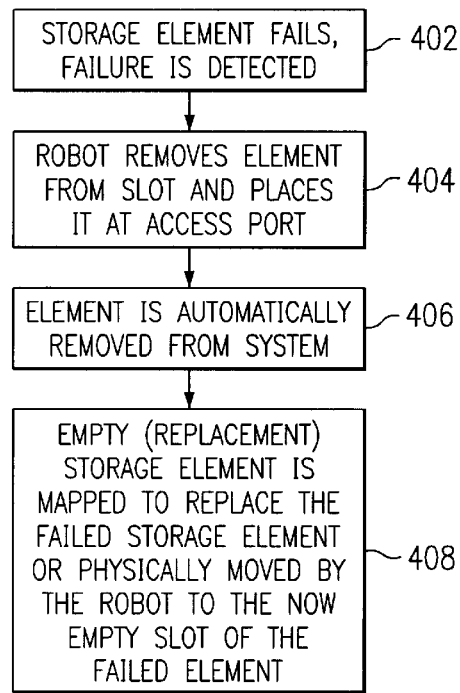
FIG. 4 shows a flow chart of a process for implementing the innovative storage library and method.

FIG. 4 shows a flow chart of this innovative embodiment. Similarly to the flow of FIG. 3, the process starts with a storage element failing, and the failure being detected by the system (step 402). Next, a robot removes the element from the slot and preferably places it at the access port (step 404). Next, the element is automatically removed from the system (step 406). (It should be noted that some of these steps are omitted in some embodiments, depending on the implementation.)

After the failed element is removed, an empty storage element (preferably from a spare location within the library) is mapped to replace or physically moved by the robot to the now empty storage slot of the failed element (step 408). If necessary, the new storage element is connected (either directly if the required hardware is present, or indirectly through the read/write drives of the library) to the storage element containing the data from the failed element—the second half of the mirror (step 410). The data is then transferred from the second half of the mirror to the empty storage element, rebuilding the data (step 412).

This innovative embodiment greatly reduces the required downtime of data storage elements if the data is only supported via the ghost mirror and not consciously mirrored in the library,by the using or the managing system. Independent of how data is protected (i.e., mirrored or ghost mirrored), the period of exposure to data loss (i.e., while the data is stored on only one storage element.) is greatly diminished by the innovation.

The present innovations also allow for a change in the paradigm for data backup and archive. The current paradigm moves online data, which is in random access form to serial access media which cannot be used directly. The present inventions allow for a simple instantaneous backup or archive of data stored within the library in its directly usable random access form. In the mirrored or ghost mirrored data structure of the aforementioned embodiments, archive copies of the data can easily be made, preserving the random access form (e.g., on a magnetic disk drive). This is done by "breaking" the mirror (i.e., disconnecting the two mirrored storage elements), then copying the contents of one half to a separate (third) storage element (preferably a magnetic disk drive). When the ghost mirror is a redundancy such as RAID 5 rather than the RAID 1 mirror, the "breaking" of the ghost mirror is accomplished by freezing the current redundancy and logging all changes to the data to a new redundancy area until the copy operation is completed. In such a system, the backup "copy" of the data (i.e., the copy intended for archive purposes) can be equipped with a marker indicating what data is on that storage element. For example, in a preferred embodiment, each archive copy of data created is fitted with an RF chip that is readable by a computer system-a wand or other scanner type device that can pick up RF signals. The RF chip on the storage element, when read (either by a human user or by a storage library or by routing equipment for the storage elements, for example) indicates what data is located on that storage element. Thus the storage element's can be interchanged with multiple sites and their contents can be determined without ever needing to connect the storage element to a read/write drive or powering it up. This information is used to determine where and how the storage elements should be archived and what data is stored on archived storage elements.

An extension to these embodiments is to incorporate the ability of network connections to broadcast or multicast data transfers. When the robot is called upon to connect slots and make them active, it is also possible to establish secondary connection(s) where the subsequent connections are communication lines that receive data via multicast or broadcast. When data is written to the primary storage element, it is also simultaneously written to the other storage elements via the subsequent connections. The subsequent connections could be in a loop such as a standard fiber channel loop or Ethernet, or they could be in a star connection such as a standard fiber channel switch connection.

Figure 5:
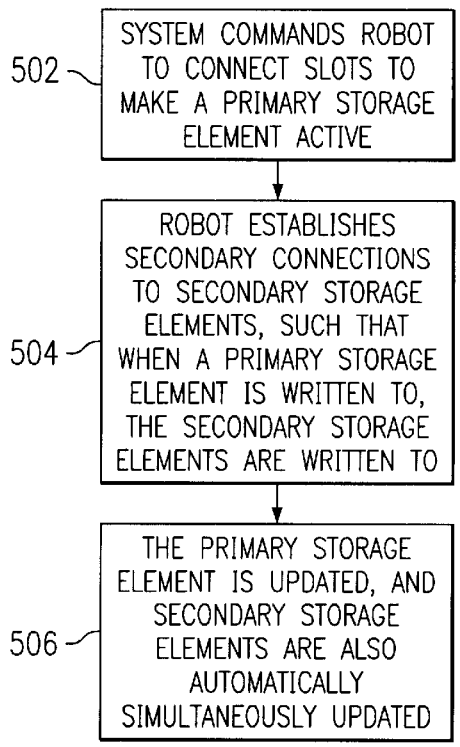
FIG. 5 shows a flow chart of a process for implementing the innovative storage library and method.

FIG. 5 shows a flowchart of such a process. First, the system commands the robot to connect such slots so as to make a given primary storage element active (step 502). Next, the robot also establishes secondary connections to secondary storage elements, such that when a primary storage element is written to, the secondary storage elements are also written to (step 504). Next, the primary storage element is updated, and the secondary storage elements are also automatically and simultaneously updated (step 506).

The present innovative system allows remote users, or user systems, to submit commands that will have effect in the storage system. For example, It is important to note that while the present invention has been described in the context of a fully functioning data storage system, those of ordinary skill in the art will appreciate that the processes of the present invention are capable of being applied to larger context systems and to subparts of a storage system. Also, the specific examples used in this description are not intended to limit the application of the present innovations, but only to serve as example instruction to one of ordinary skill in the art. Examples of computer readable media include, but are not restricted to recordable types of media such a magnetic tape, an optical tape, a holographic cube, a holographic disk or tape, a MEMS-Probe chip, a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data storage system, comprising:
a storage library having storage slots capable of receiving storage elements, the library also having an access port;
an access device for inserting storage elements into the storage slots and extracting storage elements from the storage slots;
wherein under predetermined circumstances, the access device automatically extracts a storage element from a storage slot and removes the storage element from the library by sending the storage element through the access port.

2. The data storage system of claim 1, wherein the storage library is connected to a network.

3. The data storage system of claim 1, wherein the storage elements are selected from the group consisting of magnetic disk drives, tape drives, floppy disks, and compact disks.

4. The data storage system of claim 1, wherein the predetermined circumstances include failure of a storage element.

5. The data storage system of claim 1, wherein the storage elements include rf chips indicating, to a reader, what data is contained on the storage element.

6. The data storage system of claim 1, wherein when a storage element is removed from the library, the access device automatically retrieves a spare storage element from a storage facility and inserts the spare storage element into a storage slot of the library; and
wherein the access device performs all necessary connections required for the spare storage element to communicate with the storage library.

7. An automated storage system, comprising:
a plurality of storage elements positioned in storage slots of the storage system, at least some of the storage slots being connected to a network by access cables and some storage slots not being so connected;
a robot for disconnecting the access cables from a first storage slot and reconnecting the access cables to a second storage slot;
wherein under predetermined circumstances, the robot disconnects the access cable from the first storage slot and attaches the access cable to the second storage slot.

8. The storage system of claim 7, wherein the predetermined circumstances include failure of a mechanism associated with the storage slot.

9. The storage system of claim 7, wherein the predetermined circumstances include when the robot receives specific instructions from a remote user.

10. The storage system of claim 7, wherein the predetermined circumstances include automated processes initiated by installation policy metadata stored in the subsystem.

11. The storage system of claim 7, wherein the predetermined circumstances include a change in the state of a virtual volume such as the system changing the redundancy requirements for data protection.

12. The storage system of claim 7, wherein the storage element stored in the first storage slot is removed from the storage system by the robot without human intervention.

13. The storage system of claim 7, wherein the storage elements include radio frequency chips for indicating the contents of the storage elements to a reader.

14. The storage system of claim 7, wherein the predetermined circumstances include instructions to connect via cable at least one subsequent storage slot associated with the second storage slot.

15. The storage system of claim 14, wherein the said at least one subsequent storage slot associated with the second storage slot is connected in a loop extending the connection from the network to the second storage slot.

16. The storage system of claim 14, wherein the said at least one subsequent storage slot associated with the second storage slot is connected in a switch relationship to the connection from the network to the second storage slot.

17. The storage system of claim 7, wherein the access cables provide power for storage slots.

18. The storage system of claim 7, wherein the robot is for connecting and disconnecting, moving, and reconnecting power cables to storage slots in the storage system.

19. A data storage system, comprising:

a storage library having a plurality of storage slots for receiving storage elements;

an access cable which, when connected to a storage slot of the plurality of storage slots, provides data transfer access to a storage element of the storage slot to which the access cable is connected;

an access device for disconnecting the access cable from storage slots of the storage system and connecting the access cable to storage slots of the storage system.

20. The storage system of claim 19, wherein the storage library is connected to a network.

21. The storage system of claim 19, wherein the storage elements are selected from the group consisting of magnetic disk drives, tape drives, floppy disks, and compact disks.

22. The storage system of claim 19, wherein the access device is also for removing individual storage elements from the library.

23. The storage system of claim 19, wherein when an access cable is moved, the storage system automatically maps the new location of the cable.

24. A method of data storage, comprising:

(a) storing data of a first storage element of a first storage slot of a library in such a redundancy manner that the first storage element can be read from a second storage element within a second storage slot of the library, the library having an access device for manipulating storage elements;

(b) when the data of the first storage element becomes inaccessible, removing the first storage element from the first storage slot;

(c) moving a third storage element to the first storage slot;

(d) copying the data from the second storage element to the third storage element;

wherein the steps (b), (c), and (d) are accomplished using control software and require no direct human intervention.

25. The method of claim 24, wherein the storage elements are selected from the group consisting of magnetic disk drives, tape drives, floppy disks, and compact disks.

26. The method of claim 24, further comprising the step of removing the first storage element from the library.

27. A method of data management in a storage library system, comprising the steps of:

when a first storage element in a first slot in the storage library system fails, removing the first storage element from the first slot in the library;

operably connecting access and power apparatus such that a second storage element can communicate with the library system;

wherein the steps of removing and connecting are accomplished by a control system of the storage library system without human intervention.

28. The method of claim 27, further comprising the step of transferring data from a third storage element to the second storage element, wherein the third storage element contains data previously contained on the first storage element.

29. The method of claim 27, further comprising the step of mapping the location of the second storage element to replace the first storage element.

30. The method of claim 27, wherein the second storage element is stored in a spare storage location within the library and accessible to a robotic access device which can move the spare storage element within the library.

* * * * *